United States Patent [19]

Ebenstein et al.

[11] Patent Number: 5,666,855
[45] Date of Patent: Sep. 16, 1997

[54] VEHICLE SHIFTER WITH MECHANICALLY CONNECTABLE PIVOT

[75] Inventors: Scott M. Ebenstein, Rockford, Mich.; Lee N. Bowers, Fairborn, Ohio

[73] Assignees: Grand Haven Stamped Products, Grand Haven, Mich.; Honda Motors, Tokyo, Japan

[21] Appl. No.: 518,522

[22] Filed: Aug. 23, 1995

[51] Int. Cl.⁶ ................................................. F16H 59/02
[52] U.S. Cl. ........................ 74/475; 29/428; 29/469; 74/473 R; 74/538; 384/291; 384/377; 403/353
[58] Field of Search ................. 74/473 R, 475, 74/538; 29/428, 469; 384/291, 377; 403/354, 353

[56] References Cited

U.S. PATENT DOCUMENTS

| 5,309,783 | 5/1994 | Doolittle et al. | 74/473 |
|---|---|---|---|
| 5,445,046 | 8/1995 | Kataumi et al. | 74/527 |
| 5,497,673 | 3/1996 | Kataumi et al. | 74/473 R |
| 5,522,279 | 6/1996 | Kataumi | 74/473 R |

FOREIGN PATENT DOCUMENTS

| 1400967 | 11/1968 | Germany | 384/291 |
|---|---|---|---|

*Primary Examiner*—Allan D. Herrmann
*Attorney, Agent, or Firm*—Price, Heneveld, Cooper, DeWitt & Litton

[57] ABSTRACT

A shifter for a vehicle includes a base for attachment to the vehicle, and a transmission shift lever having a slidably connectable pivot for pivoting shift lever to the base. The base includes configured sidewalls defining opposing sockets having a first diameter and inlets to the sockets having a first width less than the first diameter. The shift lever includes an integrally molded pivot member with protruding flat-sided rod sections. The rod sections define a second diameter about equal to the first diameter, and the flat sides of the rod sections define a second width about equal to the first width. By positioning the shift lever in an assembly-permitting angular position, the flat sides align with the inlet and the pivot member can be slid through the inlets into releasable pivotal engagement with the sockets. When the shift lever is pivoted from the assembly-permitting angular position to a plurality of gear shift positions, the flat sides of the rod sections are pivoted out of alignment with the inlets such that the shift lever is non-releasably pivotally retained in the sockets. A method includes slidably engaging the pivot members on the shift lever into the sockets in the base, and pivoting the shift lever from an assembly-permitting angular position to the gear positions to retain the shift lever in the sockets.

38 Claims, 7 Drawing Sheets

VEHICLE SHIFTER WITH MECHANICALLY CONNECTABLE PIVOT

BACKGROUND OF THE INVENTION

The present invention concerns shifters for shifting vehicle transmissions, and more particularly concerns a shifter having a pivot constructed to facilitate assembly.

The vehicle manufacturing industry is highly competitive, and it is important to design vehicle components with a minimum of parts, labor, and secondary assembly operations to minimize costs. Further, modern vehicle manufacturers are emphasizing just-in-time delivery and low inventories as a way of reducing costs. Often, these assembly methods often result in shifter components being manufactured in a central first location and subassembled in a plurality of satellite second locations near the various vehicle assembly plants. It is desirable to use unskilled labor and a minimum of assembly equipment and parts at the second locations since it can be expensive to maintain a skilled staff and assembly equipment at each second facility. Concurrently, it is desirable to minimize the chances of misassembly, and also to provide a serviceable shifter that can be readily disassembled and repaired if necessary, since it can be difficult to control quality at the second facilities.

Presently, many shifters include a base and one or more pivot pins for pivoting a shift lever to the base. One common securement method is to stake, peen, or otherwise deform an end of the pivot pins to secure the pivot pins in place. However, the deformation process requires power equipment and close quality control to assure that the deformation is consistent and adequately secure without binding the pivotal connection. Also, the pivot pins must be inventoried. Still further, the pivot pins must be handled and manipulated during assembly, and also holes in parts for receiving the pivot pins must be aligned, such that the assembly process is more tedious and inefficient than desired.

Thus, a shifter is desired that can be efficiently constructed with a minimum of parts and that can be readily assembled with a minimum of risk of misassembly, but which are secure, reliable, and serviceable.

SUMMARY OF THE INVENTION

The present invention includes a shifter for a vehicle including a base for attachment to the vehicle, and a shift lever for shifting a vehicle transmission. The base includes a mount, and the shift lever includes a pivot member pivotally engageable with the mount for pivotally supporting the shift lever for movement about an axis of rotation between an assembly-permitting angular position and a plurality of gear shift positions. The pivot member is configured to slidably releasably engage the mount from a direction generally perpendicular to the axis when positioned in the assembly-permitting angular position and further is configured to non-releasably pivotally engage the mount when in the gear shift positions. In one form, the pivot is integrally molded as part of the shift lever, such that the shift lever can be assembled to the base without the use of separate fasteners.

The present invention further includes a method of assembly. The method includes providing a base including opposing sockets and access openings to the sockets, and a shift lever having a pivot member for pivotally engaging the sockets. The pivot member is configured to slide through the access openings and releasably engage the sockets when in an assembly-permitting angular position but is configured to non-releasably engage the sockets when pivoted from the assembly-permitting angular position. The method further includes steps of slidably engaging the pivot member shift lever into the sockets, and pivoting the shift lever from the assembly-permitting angular position to a gear position to retain the shift lever in the sockets.

These and other features and advantages of the present invention will be further understood and appreciated by those skilled in the art by reference to the following specification, claims and appended drawings.

DETAILED DESCRIPTION OF PREFERRED EMBODIMENT

Figure 1:
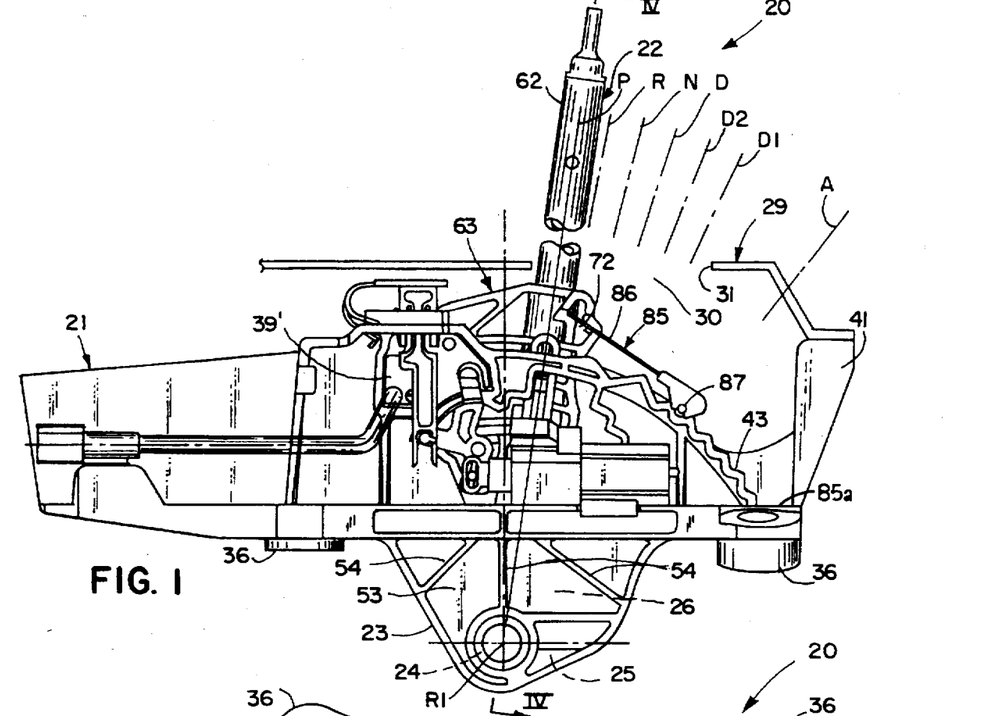
FIG. 1 is a side view of a shifter embodying the present invention.
Figures 1A, 3, 4:
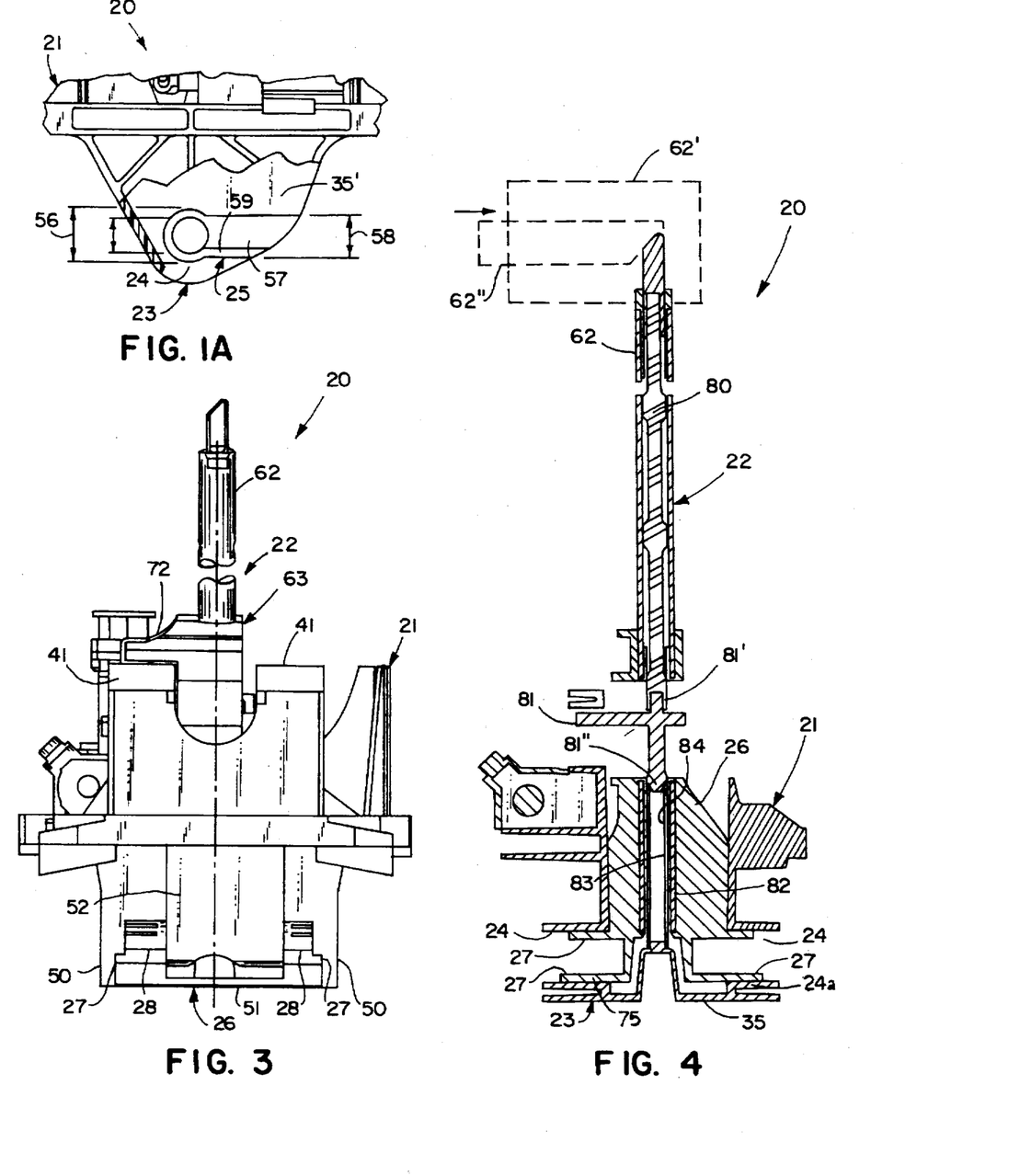
FIG. 1A is a fragmentary side view of the shifter shown in FIG. 1.
FIG. 3 is a rear end view of the shifter shown in FIG. 1
FIG. 4 is a cross sectional view taken along the line IV—IV in FIG. 1.
Figure 2:
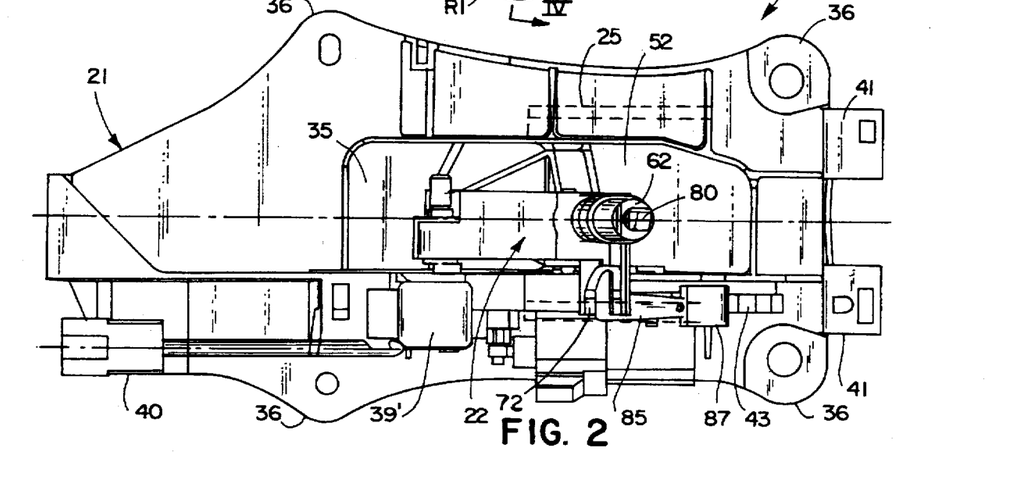
FIG. 2 is a top view of the shifter shown in FIG. 1.

A shifter 20 (FIG. 1) includes a base 21 configured for attachment to a vehicle floor pan, and a shift lever 22 configured for pivotal attachment to the base 21. The base 21 includes a mount 23 having a pair of opposing sockets 24 and inlets 25 to the sockets 24, and the shift lever 22 includes a pivot member 26 having protruding rod sections 27 constructed to slidably releasably engage the inlets 25 and pivotally engage the sockets 24. Sockets 24 include arcuate bottom bearing surfaces 24a (FIG. 4). The rod sections 27 include flattened sides 28 (FIG. 11) that align with the inlets 25 (FIG. 1A) when in an assembly-permitting angular position "A", but which become misaligned when the shift lever 22 is pivoted about an axis of rotation "R1" from the assembly-permitting angular position "A" (FIG. 1) to one of the plurality of gear positions, such as the gear positions park "P", reverse "R", neutral "N", drive "D", second gear "D2", or first gear "D1". Rod sections 27 include bottom arcuate bearing surfaces 75 (FIGS. 4 and 11–13). A pawl 81 is attached to the shift lever 22 and engages a notched aperture 38 in a detent plate 37 on base 21 in a manner that prevents shift lever 22 from accidentally being moved to the assembly-permitting angular position, thus preventing accidental disassembly of the shift lever 22 from the base 21. Optimally, the pivot member 26 is integrally formed as part of the shift lever 22, such that the shift lever 22 can be attached to the base 21 without the use of separate fasteners.

Figure 5:
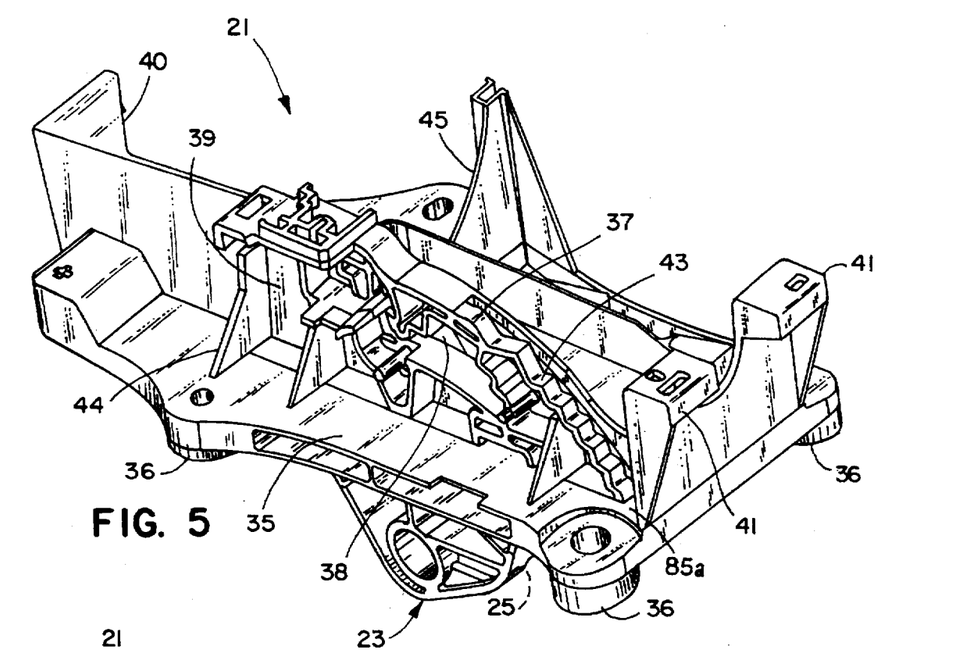
FIGS. 5 and 6 are top perspective views of the base shown in FIG. 1.
Figure 6:
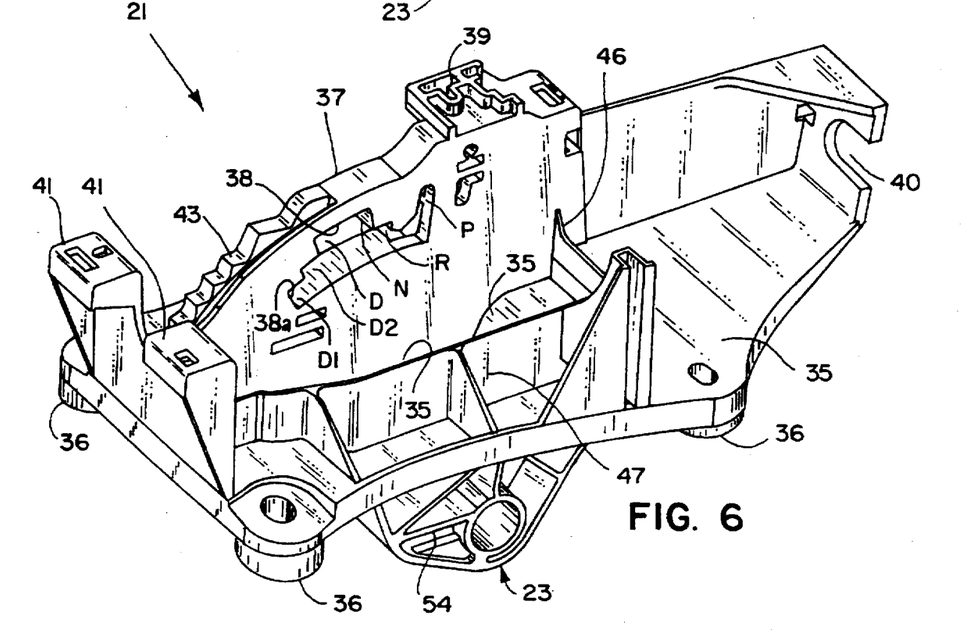

Base 21 (FIGS. 5 and 6) includes a bottom panel 35, and a plurality of apertured flanges 36 for attaching the base 21 to the vehicle. A detent plate 37 extends vertically along the longitudinal centerline of base 21, and includes notches 38 defining the gear positions "P", "R", "N", "D", "D2", and "D1". Various mounting structures are also formed on base 21, including a solenoid mount 39 for a brake-interlock solenoid 39', a transmission shift cable sheath connector 40, and stanchions 41 for attachment of an escutcheon 29 (FIG. 1). A plurality of depressions 43 are formed along the top and rear surface of detent plate 37. The depressions 43 are configured to form part of a feel positioner, as described below. Various reinforcement ribs, such as ribs 44–47, are formed on base 21 to reinforce and rigidify base 21.

Figure 7:
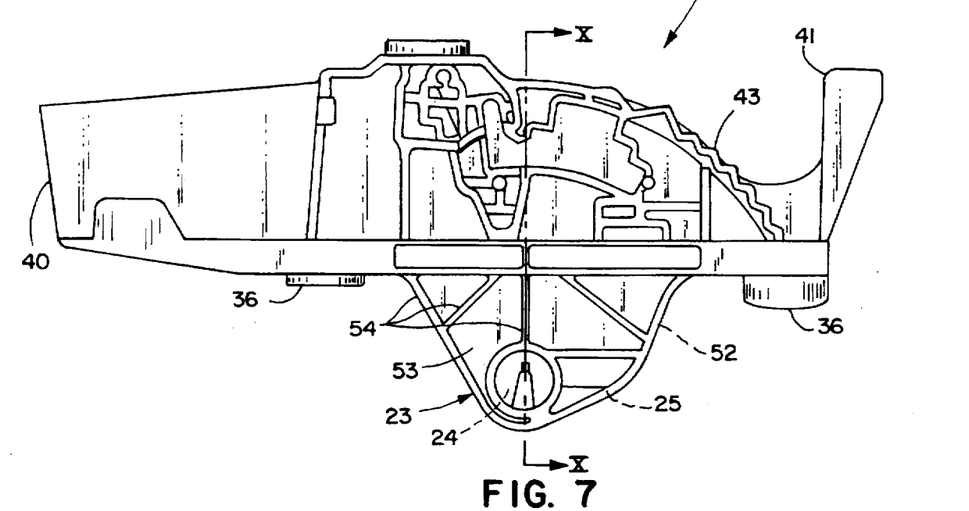
FIG. 7 is a side view of the base shown in FIG. 5.
Figure 8:
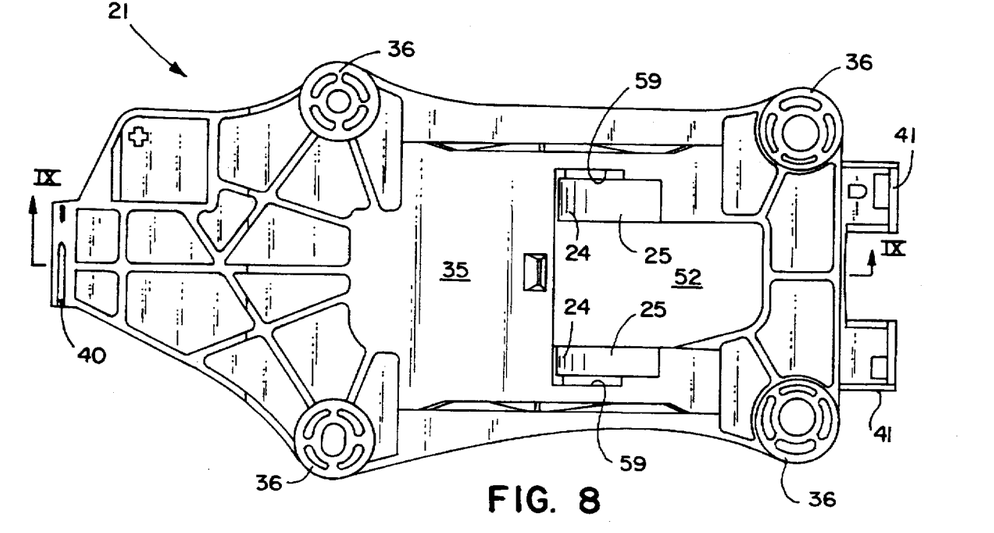
FIG. 8 is a bottom view of the base shown in FIG. 5.
Figures 9, 10, 11, 12:
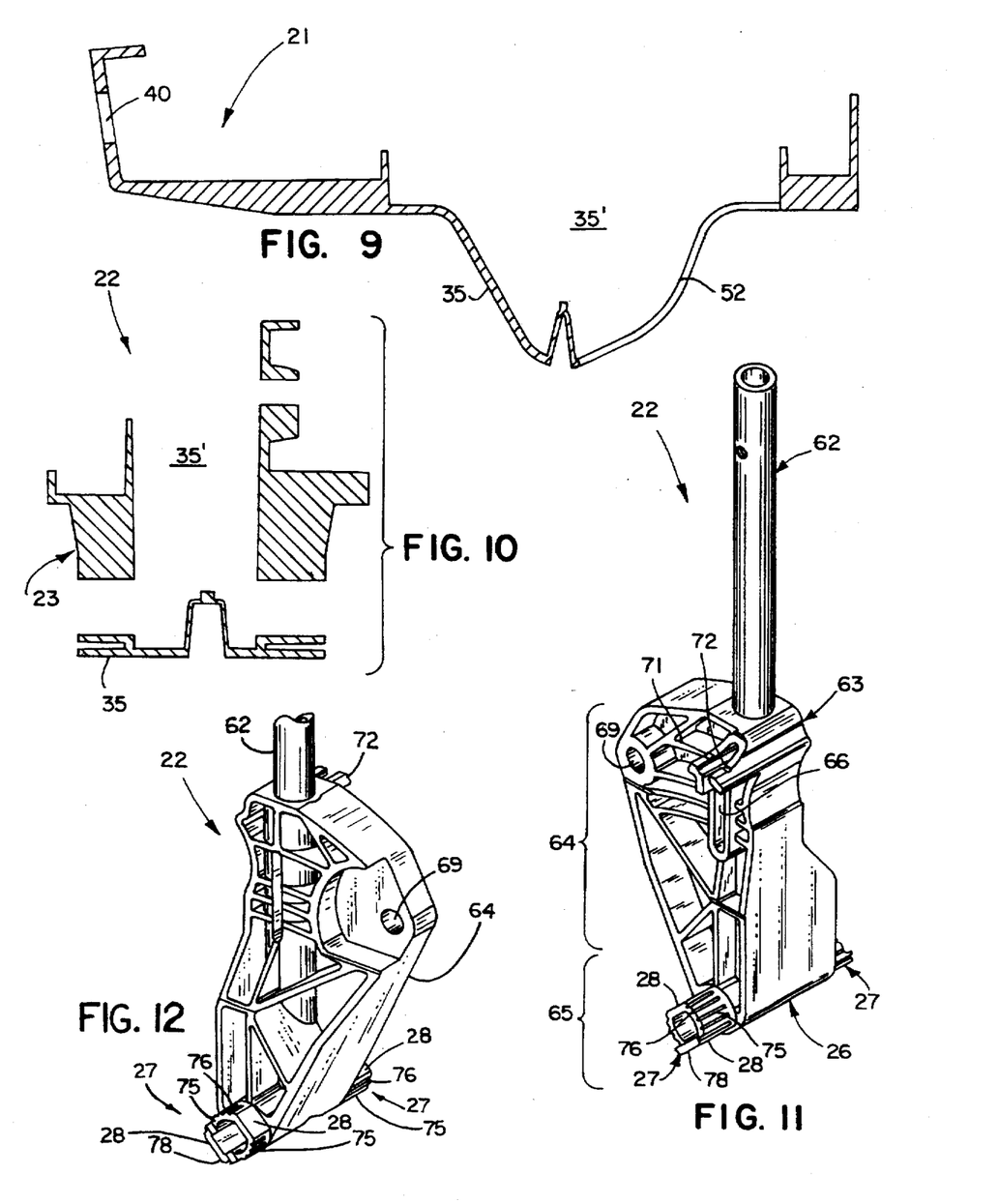
FIG. 9 is a cross sectional view taken along the line IX—IX in FIG. 8.
FIG. 10 is a cross sectional view taken along the line X—X in FIG. 7.
FIGS. 11 and 12 are top perspective views of the shift lever shown in FIG. 1.

A pan-shaped depression 35' (FIG. 6) is formed in bottom panel 35 by configured opposing sidewalls 50 and bottom wall section 51. An aperture 52 (FIG. 3) is formed in bottom wall section 51 in the space between configured sidewalls 50 and at the rear of bottom wall section 51. Configured sidewalls 50 are generally mirror images of each other, and accordingly only one sidewall 50 is described in detail. The sidewall 50 includes a generally vertical panel 53 (FIG. 7) reinforced on the outside with webs 54 (FIG. 1). The inner surface 55 (FIG. 1A) of sidewall 50 is generally flat, but includes the socket 24 and the horizontal facing inlet 25 to the socket 24. The socket 24 is a disk-shaped recess having a diameter 56. The inlet 25 extends linearly rearwardly from socket 24 to a rear edge of configured sidewall 50. Inlet 25 includes a channel 57 having a width dimension 58 which is slightly less than the diameter 56. Channel 57 extends symmetrically centrally into socket 24 in a near tangential arrangement, but the arrangement is not tangential since the width of channel 57 is less than the socket diameter 56. Inlet 25 further includes a groove 59 in the bottom of channel 57 that extends the length of channel 57 and along a lower side of the channel 57.

Shift lever 22 (FIG. 11) includes a tubular post 62 and a molded body 63 of polymeric resin such as glass reinforced nylon secured or molded to the post 62. In a preferred form, a lower section 82 of tube 62 is insert molded into body 63, and further body 63 (FIG. 4) includes a lining/sleeve of molded material 83 that lines tube section 82 and prevents pawl 81 from rattling or creating a grating noise as it moves within body 63. For example, it is contemplated that the liner material/sleeve 83 can be molded into the inside of tube section 82 during the process of insert molding body 63 onto post 62. A spring 84 is located within tube section 82 for biasing pawl 81 upwardly, as discussed below.

The molded body 63 (FIG. 11) includes an upper section 64 and a lower section 65. The upper section 64 includes a slot 66 for receiving the pawl 81. The upper section 64 further includes a panel 68 that extends generally forwardly from post 62 having various features on it as required by particular vehicles, such as an aperture 69 for receiving a universal cable connector (not specifically shown) for connecting to a transmission cable, and an interlock pocket (not specifically shown) for receiving an extendable rod on a solenoid operated brake-ignition-transmission-shift-interlock system (i.e. a BITSI system). Such systems are generally known in the art, and their disclosure is not necessary to an understanding of the present invention. Panel 68 is reinforced by webs 71 as required for rigidity. A spring retainer 72 is formed in body 63 generally above, rearward and to one side of slot 66 for supporting a feel positioner, as discussed below.

Figure 17:
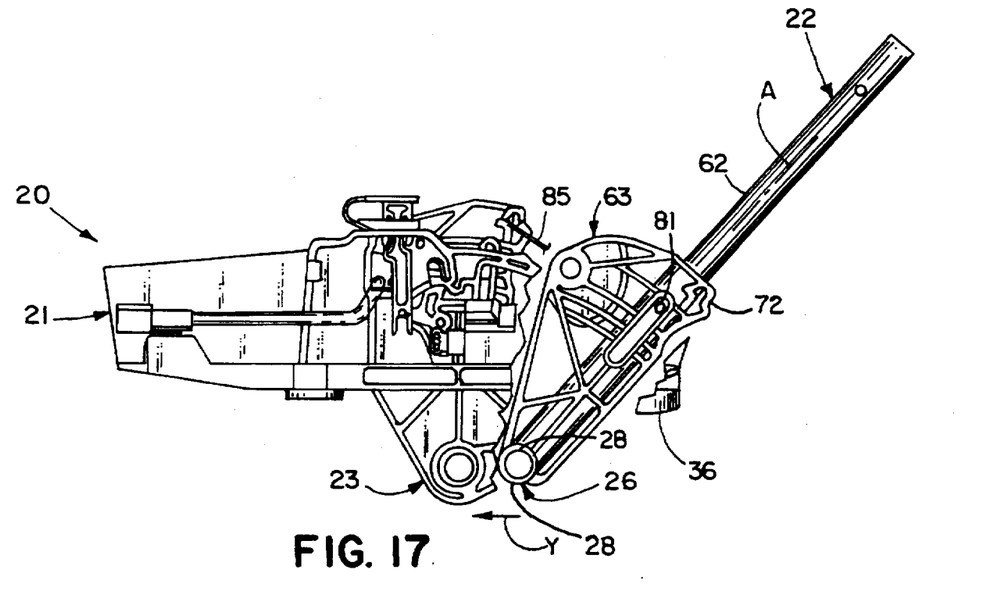
FIG. 17 is an exploded side view of the base and the shift lever with the shift lever positioned in an assembly-permitting angular position and thus ready to be slidably installed into the base, the base being broken away to reveal the shift lever.
Figure 18:
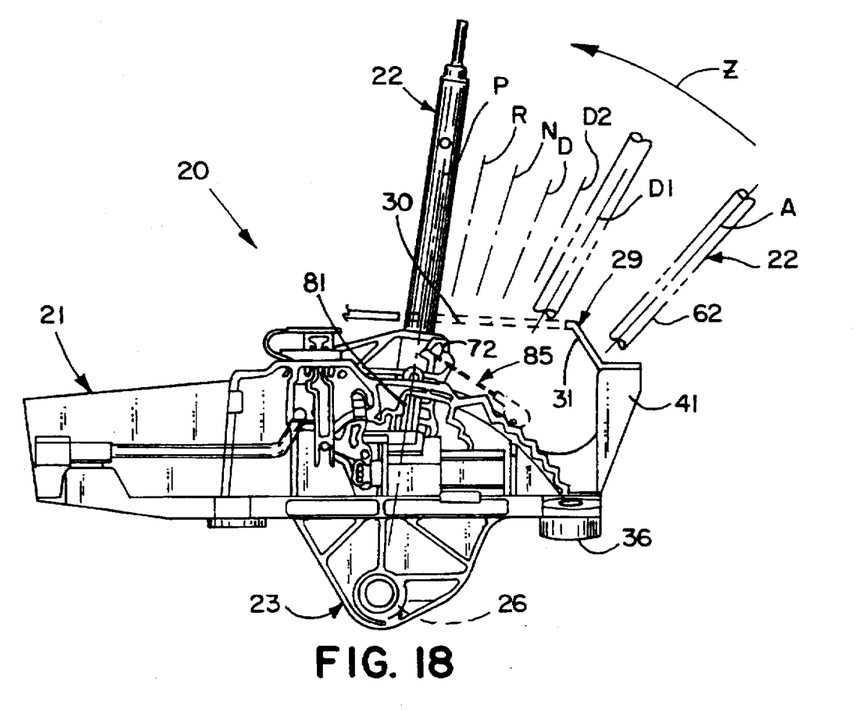
FIG. 18 is a side view of the assembled shifter, the shift lever being fully assembled to the base and pivotable between an assembly-permitting angular position and a plurality of gear positions.

The lower section 65 of body 63 includes the pivot member 26 comprising rods 27 with flattened sides 28. Rods 27 include a bearing surface 75 for slidably rotatingly engaging socket 24. Bearing surface 75 defines a diameter about equal to the diameter of socket 24. A series of lubricant retaining pockets 76 are formed in bearing surface 75 for retaining lubricant. The flat sides 28 are located on opposite sides of rods 27, and define a width dimension 77 that is about equal to the width dimension of inlet 25. A flat protrusion 78 extends longitudinally from an end of rod 27 parallel flat side 28. Specifically, the outer surface of flat protrusion 78 aligns with the flat side 28. Flat protrusion 78 provides additional bearing surface on pivot member 26 for engaging mount 23. Further, flat protrusion 78 is configured to slidably engage groove 59 in inlet 25 (FIG. 1A) when shift lever 22 is in the assembly-permitting angular position (FIG. 17), thus adding stability to the arrangement. Pivot member 26 has a width dimension that generally fills the space between configured sidewalls 50, and is configured to slidably engage the inner surfaces 55 of sidewalls 50.

Shift lever 22 (FIG. 4) includes a straw 80 slidably positioned within post 62. Pawl 81 is configured to fit laterally into shift lever 22 between the bottom of post 62 and above reinforcement tube 82 after shift lever 22 is slip-attached to base 21 (i.e. after rod sections 27 are operably engaged with sockets 24). Pawl 81 includes an upper end 81' configured to frictionally, press-fittingly engage the bottom of straw 80, and further includes a lower end 81" configured to operably slidably engage tube liner/sleeve 83 and also configured to mateably engage spring 84. The subassembly of straw 80 and pawl 81 can be moved vertically in post 62 by actuating a thumb button 62" on a handle 62' at the top of post 62. The spring 84 vertically biases the straw 80 and pawl 81 to an upward detent-notch-engaged position. Notably, once pawl 81 is assembled to straw 80, the pawl 81 engages notched detent-forming aperture 38 and acts as a stop to prevent shift lever 22 from being accidentally moved to the assembly-permitting (and disassembly-permitting) angular position "A".

A feel positioner 85 (FIG. 1) including a biasing leaf spring 86 is engaged with the spring retainer 72 on body 63. The feel positioner 85 includes a roller 87 operably supported at the free end of leaf spring 86. The roller 87 is biased into engagement with the depressions 43. The depressions 43 and the roller 87 operably engage to provide an aesthetic and comfortable feel for an operator as the operator shifts the shift lever 22 between the various gear positions. Once installed, the feel positioner 85 also provides an interference at 85a against base 21 that prevents the shift lever 22 from being shifted beyond the first gear position "D1" back to the assembly-permitting angular position "A".

An escutcheon 29 is attached to base 21 after assembly of shift lever 22 to base 21. Escutcheon 29 includes a slot 30 having an end 31. It is contemplated that the end 31 can be used as a stop to limit movement of the shift lever 22 to prevent shift lever 22 from being pivoted to the assembly-permitting angular position "A". Escutcheon 29 may include indicia identifying the gear positions PRNDL.

Figures 13, 14, 15, 16:
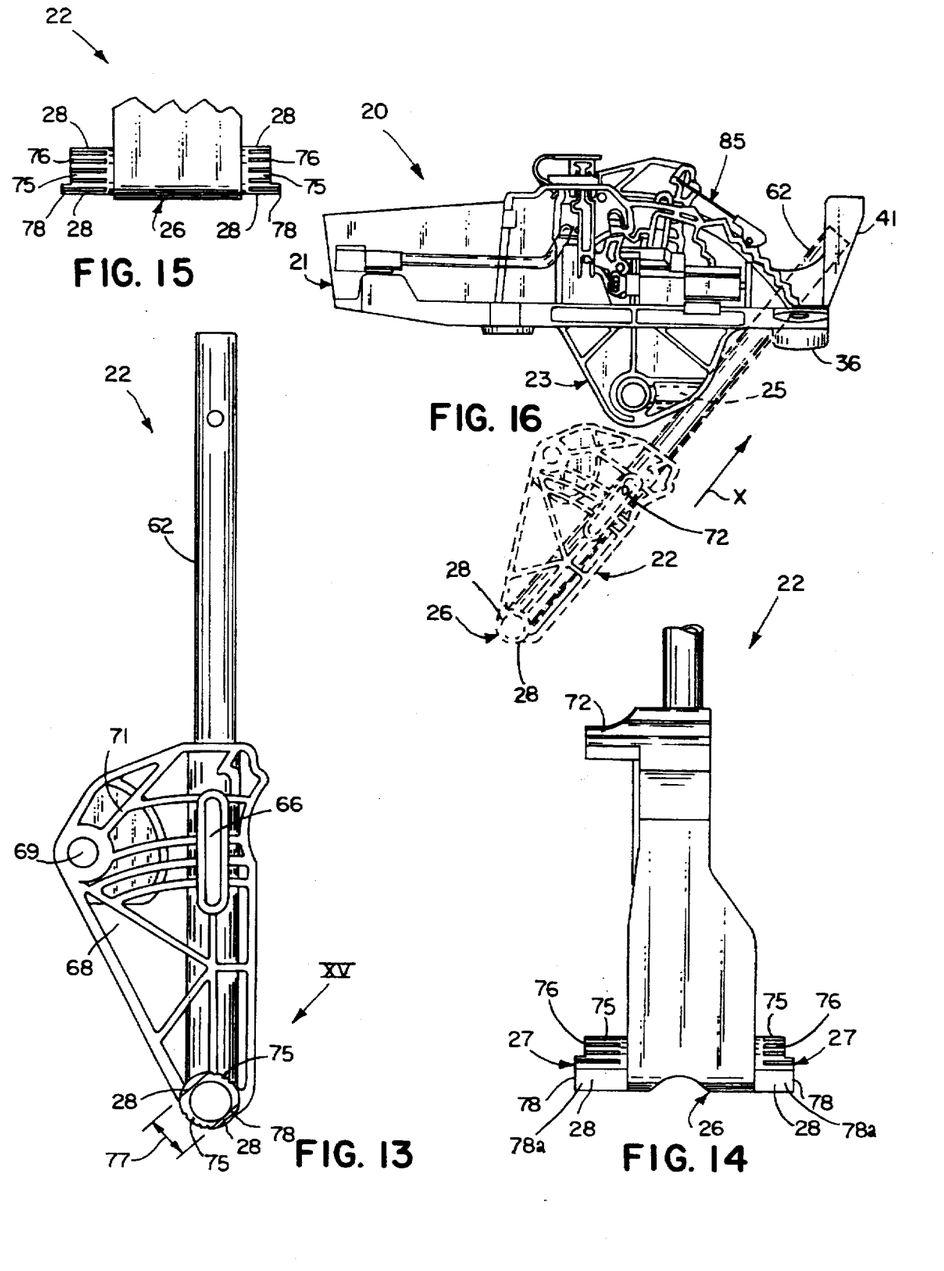
FIG. 13 is a side view of the shift lever shown in FIG. 11.
FIG. 14 is a fragmentary side view of the shift lever shown in FIG. 11.
FIG. 15 is a fragmentary view of the shift lever taken in the direction XV in FIG. 13.
FIG. 16 is an exploded side view of the base and the shift lever with the shift lever partially assembled to the base.

The shifter 20 is assembled by extending the shift lever 22 through the aperture 52 in the bottom panel 35 of the base 21 along direction "X" (FIG. 16). Once the shift lever 22 has been fully inserted (FIG. 17), the shift lever 22 is positioned in the assembly-permitting angular position "A". In this position, the rod sections 27 of pivot member 26 align with the inlets 25 of mount 23. In particular, the flat sides 28 align with the sides of inlets 25, and the flat protrusions 78 align with the grooves 59 in the inlets 25. The rod sections 27 can thus be slid through the inlets 25 along direction "Y" into pivotal engagement with the sockets 24. Once the rod sections 27 are fully seated in the sockets 24, the shift lever 22 can be pivoted from the assembly-permitting angular position "A" along direction "Z" to any of the gear positions "P", "R", "N", "D", "D1" and "D2". As the shift lever is pivoted from the assembly-permitting angular position "A", the flat sides 28 of rod sections 27 become misaligned with the sides of inlet 25. Thus, the shift lever 22 is non-releasably retained in the sockets 24 by frictional engagement of the rod sections 27 with the bearing surface in sockets 24. Thereafter, pawl 81 is attached to shift lever 22 by frictionally attaching pawl 81 to straw 80 with spring 84 located below pawl 81. Pawl 81 engages notched aperture 38 providing a stop 38a to prevent moving shift lever 22 to the assembly-permitting (disassembly-permitting) angular position "A".

Escutcheon 29 is also attached to the base 21. Notably, the escutcheon 29 includes the end 31 forming a secondary stop that, like pawl 81, also limits the rearward pivotal movement of shift lever 22 to a location short of assembly-permitting angular position "A". Also, the feel positioner 85 is attached to the shift lever 22 for engaging the gear-defining depressions 43 on the base 21. Depending on its design, the feel positioner 85 can be attached before or after the shift lever 22 is pivotally attached to the base 21. The feel positioner 85 provides an operator with a feel for the gear positions and also potentially provides interference that prevents the shift lever 21 from accidentally being moved to the assembly-permitting angular position "A".

Thus, a shifter is provided including a base having a molded body forming a mount with opposing sockets and inlets to the sockets, and a shift lever having a molded body including opposing rod sections for mateably slidably engaging the inlets and pivotally engaging the sockets. The rod sections are configured to slide through the inlets into the sockets when in an assembly-permitting angular position and to releasable engage the sockets, but are further configured to non-releasably pivotally engage the sockets when in gear defining positions. In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. A shifter for a vehicle comprising:
 a base for attachment to the vehicle, the base including a mount; and
 a shift lever for shifting a vehicle transmission, the shift lever including a pivot member engageable with the mount for pivotally supporting the shift lever on the mount for movement about the axis of rotation between an assembly-permitting angular position and a plurality of gear positions, the pivot member being configured to slidably releasably engage the mount from a direction generally perpendicular to the axis when the shift lever is positioned in the assembly-permitting angular position and further being configured to non-releasably pivotally engage the mount when the shift lever is in the gear shift positions, the mount including a continuous first bottom bearing surface and the pivot member including a mating second bottom bearing surface for stably engaging the first bottom bearing surface for long term wear.

2. The shifter defined in claim 1 wherein the pivot member is integrally attached to the shift lever.

3. The shifter defined in claim 2 wherein the pivot member comprises polymeric resin molded onto the shift lever.

4. The shifter defined in claim 1 wherein the base includes opposing sidewalls forming sockets, the sockets having an open side defining an inlet for receiving the pivot member.

5. The shifter defined in claim 1 including a stop attached to at least one of the base and the shift lever for preventing the shift lever from accidentally returning to the assembly-permitting angular position after assembly.

6. The shifter defined in claim 5 wherein the stop includes one of a pawl, an escutcheon, and a feel positioner.

7. The shifter defined in claim 1 wherein the pivot member includes a pair of opposing pivot-pin-simulating rod sections each having a bearing surface defining a first diameter and at least one flattened side defining a first width less than the first diameter.

8. The shifter defined in claim 7 wherein the mount includes sockets having a second diameter about equal to the first diameter and inlets to the sockets having a second width about equal to the first width, the rod sections being alignable and mateably engageable with the inlets when in the assembly-permitting angular position so that the rod sections can be slid through said inlets into the sockets.

9. The shifter defined in claim 1 wherein said base includes a bottom panel having an aperture therein, and wherein the shift lever is configured to extend through the aperture as the pivot member of the shift lever is aligned with the inlets of the base.

10. The shifter defined in claim 1, wherein the base includes detent-forming notches, and the shift lever includes a pawl configured to engage the notches to prevent the shift lever from being accidentally pivoted to the assembly-permitting angular position after the shift lever is assembled to the base.

11. The shifter defined in claim 1 wherein at least one of the mount and the pivot member include retaining grooves that extend generally parallel the axis of rotation.

12. The defined in claim 1 wherein the mount and the pivot member are characterized by an of a separate bearing member.

13. A shifter for a vehicle comprising:
 a base for attachment to the vehicle, the base including a mount; and
 a shift lever for shifting a vehicle transmission, the shift lever including a pivot member engageable with the mount for pivotally supporting the shift lever on the mount for movement about the axis of rotation between an assembly-permitting angular position and a plurality of gear positions, the pivot member being configured to slidably releasably engage the mount from a direction generally perpendicular to the axis when the shift lever is positioned in the assembly-permitting angular position and further being configured to non-releasably pivotally engage the mount then the shift lever is in the gear shift positions, the mount including a continuous first bottom bearing surface and the pivot member including a mating second bottom bearing surface for stably engaging the first bottom bearing surface for long term wear; a feel positioner comprising a spring-biased roller on one of the shift lever and the base, and a configured member including a plurality of gear-position-defining depressions on the other of the shift lever and the case for operably receiving the roller, the roller operably engaging the depressions to define the gear positions and further engaging the base to prevent accidentally moving the shift lever to the assembly-permitting angular position.

14. A shifter for a vehicle comprising:

a base for attachment to a vehicle;

a shift lever for shifting a vehicle transmission, the shift lever being pivotable between an assembly-permitting angular position and a plurality of gear positions; and one of the base and the shift lever defining a pair of configured sidewalls facing each other, each of said sidewalls including a pivot-defining socket having a first diameter and a horizontally-extending inlet to the socket with a first width dimension less than the first diameter, the other of the base and the shift lever including a pair of flat-sided pivot members each including a bearing surface defining a second diameter substantially equal to the first diameter and further including at least one flattened surface defining a second width dimension about equal to the first width dimension, the flat-sided pivot members being configured so that the shift lever can be assembled to the base by aligning the at least one flattened surface with the horizontally-extending inlet and by sliding the pivot members into the sockets through the inlet, whereafter the shift lever can be pivoted so that the at least one flattened surface is pivoted out of alignment with the inlet so that the pivot members are frictionally retained in the sockets without the use of separate fasteners or secondary subassembly operations.

15. The shifter defined in claim 14 wherein the pivot members are integrally attached to the shift lever.

16. The shifter defined in claim 15 wherein the pivot members comprise polymeric resin molded onto the shift lever.

17. The shifter defined in claim 14 including a stop attached to at least one of the base and the shifter for preventing the shift lever from accidentally returning to the assembly-permitting angular position.

18. The shifter defined in claim 17 wherein the stop includes one of a pawl, an escutcheon, and a feel positioner.

19. The shifter defined in claim 14 including a feel positioner comprising a spring-biased roller on one of the shift lever and the base, and a plurality of gear-position-defining depressions on the other of the shift lever and the base for operably receiving the roller, the roller operably engaging the depressions corresponding to the gear positions and further engaging the depressions to prevent accidentally moving the shift lever to the assembly-permitting angular position.

20. The shifter defined in claim 14, wherein the base includes detent-forming notches, and the shift lever includes a pawl configured to engage the notches to prevent the shift lever from being accidentally pivoted to the assembly-permitting angular position after the shift lever is assembled to the base.

21. The defined in claim 14 wherein one of the pivot defining socket and the pair of pivot members includes lubricant retaining grooves.

22. The defined in claim 14 wherein the pair of flat-sided pivot members include a located generally at the bottom of the flat-sided pivot members, the protrusion forming portion of the bearing surface and providing added support for the shift lever on the base.

23. The shifter defined in claim 14 wherein the flat-sided pivot members and the pivot defining are characterized by an absence of a separate bearing member.

24. A shifter for a vehicle comprising:

a base for attachment to the vehicle, the base including a mount; and a shift lever for shifting a vehicle transmission, the shift lever including a pivot member engageable with the mount for pivotally supporting the shift lever on the mount for movement about the axis of rotation between an assembly-permitting angular position and a plurality of gear positions, the pivot member being configured to slidably releasably engage the mount from a direction generally perpendicular to the axis when the shift lever is positioned in the assembly-permitting angular position and further being configured to non-releasably pivotally engage the mount when the shift lever is in the gear shift positions, the mount including a continuous first bottom bearing surface and the pivot member including a mating second bottom bearing surface for stably engaging the first bottom bearing surface for long term wear; said pivot member including a protrusion located generally at the bottom of the pivot member and a portion of the mating second bottom bearing surface, said protrusion providing added support for the shift lever on the mount.

25. A shift lever for shifting a vehicle transmission, said shift lever comprising:

a tubular post;

a base member, said post connected to said base member; and a pivot member extending from said base member along an axis for pivotally supporting said lever, said pivot member including a laterally-extending protrusion extending along axis and located generally at the bottom of said pivot member.

26. The shift lever of claim 25 wherein the pivot member has a generally cylindrical cross-section.

27. The shift lever of claim 25 wherein the pivot member includes at least one flat surface.

28. The shift lever of claim 27 wherein the pivot member has two flat surfaces.

29. The shift lever of claim 28 wherein the two flat surfaces are parallel to one another.

30. The shift lever of claim 28 wherein the protrusion extends from one of said flat surfaces.

31. The shift lever of claim 27 wherein said protrusion extends from said at least one flat surface.

32. The lever of claim 27 wherein said protrusion has a flat surface in alignment with said at least flat surface of said pivot member.

33. The lever of claim 25 wherein said pivot member is integral with said base member.

34. The lever of claim 25 wherein said pivot member is molded onto said base member.

35. A method of assembly comprising steps of:

providing a base including opposing sockets and horizontally-facing inlets to the sockets, and a shift lever having a pivot member for pivotally engaging the sockets, the pivot member being configured to slide through the inlets and releasably engage the sockets when in an assembly-permitting angular position but being configured to non-releasably engage the sockets when pivoted from the assembly-permitting angular position;

horizontally slidably engaging the pivot member of the shift lever into the sockets; and pivoting the shift lever from the assembly-permitting angular position to a gear position to retain shift lever in the sockets.

36. The method defined in claim 35 including a step of attaching a stop to the base to prevent accidentally moving the shift lever to the assembly-permitting angular position.

37. The method defined in claim 35, wherein the step of attaching a stop includes assembling a pawl to the shift lever after slidably engaging the pivot member into the sockets.

38. The method defined in claim 35 including steps of providing gear-defining depressions on the base, and attaching a feel positioner to the shift lever for operably engaging the depressions to provide an operator with a feel for the gear positions and for preventing the shift lever from accidentally being moved to the assembly-permitting angular position where the shift lever can be disassembled.

* * * * *

UNITED STATES PATENT AND TRADEMARK OFFICE
CERTIFICATE OF CORRECTION

PATENT NO. : 5,666,855
DATED : September 16, 1997
INVENTOR(S) : Scott M. Ebenstein et al.

It is certified that error appears in the above-identified patent and that said Letters Patent is hereby corrected as shown below:

Column 1, Line 10;
"modem" should be --modern--.

Column 6, Claim 11, Line 48;
After "include" insert --lubricant--.

Column 6, Claim 12, Line 51;
After "an" insert --absence--.

Column 6, Claim 13, Line 66;
"then" should be --when--.

Column 7, Claim 13, Line 8;
"case" should be --base--.

Column 7, Claim 21, Line 65;
Before "defined" insert --shifter--.

Column 8, Claim 22, Line 1;
Before "defined" insert --shifter--.

Column 8, Claim 22, Line 2;
Before "located" insert --protrusion--.

Column 8, Claim 22, Line 3;
After "forming" insert --a--.

Column 8, Claim 23, Line 7;
After "defining" insert --socket--.

UNITED STATES PATENT AND TRADEMARK OFFICE
CERTIFICATE OF CORRECTION

PATENT NO. : 5,666,855
DATED : September 16, 1997
INVENTOR(S) : Scott M. Ebenstein et al.

It is certified that error appears in the above-identified patent and that said Letters Patent is hereby corrected as shown below:

Column 8, Claim 24, Line 29;
        Before "a portion" insert --defining--.

Column 8, Claim 25, Line 38;
        Before "lever" insert --shift--.

Column 8, Claim 25, Line 40;
        Before "axis" insert --said--.

Column 8, Claim 32, Line 55;
        After "least" insert --one--.

Column 8, Claim 33, Line 57;
        Before "lever" insert --shift--.

Column 8, Claim 34, Line 59;
        Before "lever" insert --shift--.

Signed and Sealed this

Thirteenth Day of January, 1998

Attest:

BRUCE LEHMAN

Attesting Officer    Commissioner of Patents and Trademarks